Patented Oct. 13, 1925.

1,557,302

UNITED STATES PATENT OFFICE.

JAMES McINTOSH, OF NORRISTOWN, AND JOHN M. TAYLOR, OF BRIDGEPORT, PENN-SYLVANIA, ASSIGNORS TO DIAMOND STATE FIBRE COMPANY, OF BRIDGEPORT, PENNSYLVANIA, A CORPORATION OF DELAWARE.

MECHANICAL ELEMENT AND METHOD OF MAKING SAME.

No Drawing.    Application filed January 15, 1924. Serial No. 686,331.

*To all whom it may concern:*

Be it known that we, JAMES MCINTOSH and JOHN M. TAYLOR, citizens of the United States, residing in Norristown, Pennsylvania, and Bridgeport, Pennsylvania, respectively, have invented a Mechanical Element and Method of Making Same, of which the following is a specification.

One object of our invention is to provide a simple, practical and inexpensive process for making mechanical elements, such as pulleys, gear blanks, lever arms and the like, of high grade, and the invention also contemplates an easily operated and practical process for making such elements in either of two ways.

In accordance with one modification of our invention, we utilize an inexpensive kind of waste fibrous material such as cotton or linen or other fibres. These fibres are cut up so as to pass through a quarter inch sieve and are then intimately mixed with from forty to fifty percent of a powdered phenolic condensation product in its intermediate soluble, fusible state, such as that material known on the market as condensite. We then place the mixture in a suitable mold and subject it to a pressure of, for example, two thousand or three thousand pounds to the square inch and to a temperature of approximately three hundred and fifty degrees Fahrenheit. In the case of a gear or pulley one inch thick and four inches in diameter, we continue this treatment for one hour, though we may vary it according to the size and form of the member to be made. It may be preferable to apply sheets of impregnated fibre or other suitable material in sheet form to the otherwise exposed sides of the gear blank, pulley or other mechanical element before its ingredients are exposed to heat and pressure, in order to improve its appearance as well as increase its strength.

In accordance with the second modification of our invention, we utilize woven scrap material of fibrous nature already impregnated or thoroughly mixed with a phenolic condensation product in its intermediate or fusible soluble form. This material, after having been properly reduced to small pieces as above described, is subjected to pressure and heat in accordance with the other form of our invention for a time which as before depends on the dimensions and form of the object under treatment.

Again, we may impregnate such material as canvas, rags or other fibrous woven vegetable substances and as above described, thereafter cut these up into small pieces so that they will pass through a quarter inch sieve. Thereafter we proceed as above described to make not only mechanical elements but other solid objects having the same properties.

In all of the above cases, the result of our method of operation described is a tough, structurally strong piece of solid material, it being understood that in all of the forms described, the body or interior portion of the object may be made of the comminuted, impregnated material while the opposite external sides, and if desired other surfaces, may be made of one or any suitable number of layers of impregnated sheet material.

The finished object made by our process has a high polish, is structurally strong, waterproof, infusible and may be easily cut or operated on by tools.

We claim:

1. A solid element comprising a mass of irregularly assembled pieces of fabric impregnated with a phenolic condensation product in its final infusible form; with sheet material also impregnated with the condensation product and adherent to certain external surfaces of said solid object.

2. A solid element comprising a mass of irregularly assembled pieces of woven fabric impregnated with a phenolic condensation product in its final infusible form; with sheet material constituting the exposed side portion of said solid mechanical element.

3. The method which consists in mounting between two bodies of sheet fabric a mass of irregularly placed pieces of fabric impregnated with a phenolic condensation product in its intermediate form; and thereafter subjecting said mass to heat and pressure to form a mechanical element in which the condensation product is in its final form.

JAMES McINTOSH.
JOHN M. TAYLOR.